Patented Nov. 13, 1934

1,980,306

UNITED STATES PATENT OFFICE 1,980,306

MIXED CELLULOSE ESTERS

Adolf Weihe and Kurt Thinius, Eilenburg in Sachsen, Germany, assignors to Deutsche Celluloid-Fabrik, Eilenburg in Sachsen, Germany, a corporation of Germany No Drawing. Application February 18, 1931, Serial No. 516,831. In Germany February 24, 1930

14 Claims. (Cl. 260—101)

Our present invention relates to a new process of manufacturing cellulose mixed esters and more particularly to such esters containing in their molecule the radicle of nitric acid and of a fatty acid.

One of its objects is to provide a new process for the purpose set forth characterized by an extremely rapid course avoiding, however, as far as possible, a degradation of the cellulose molecule.

Other objects of our invention will be seen from the detailed specification following hereafter.

When mixing glacial acetic acid of commercial concentration (97% of acetic acid) with the equimolecular quantity of an acid chloride, for instance, thionyl chloride, the following reaction occurs, as is known, with evolution of heat and gas:

$$SOCl_2 + CH_3 \cdot COOH = HCl + SO_2 + CH_3 \cdot CO \cdot Cl.$$

When dissolving collodion cotton in glacial acetic acid and mixing the viscous solution with thionyl chloride, the above reaction occurs, but numerous bubbles are retained by the solution owing to its viscous constitution and in consequence thereof the mass occupies a multiple of the original volume.

The speed with which the reaction occurs depends, apart from the temperature, above all upon the water content of the reaction mixture. When using completely anhydrous components, the reaction sets in only slowly and the cellulose nitrate is not altered.

If, however, water is present, the nitric acid radicles are replaced by acetic acid radicles. With increasing content of water, the optimum reaction as regards the reesterification is found to occur when the content of water is about 5%, calculated upon the nitrocellulose. With a content of water exceeding 5%, the violence of the reaction still increases, but less acetate is formed.

It is very important in theory as well as in practice to obtain always, when starting from collodion cottons of the most varied nitrogen content (10.5–12.5% of nitrogen), while observing the optimum conditions, a mononitrate-acetate, that is ordinarily a mononitrate-diacetate.

The extremely rapid course of the reaction is characteristic for this mode of the forming of nitrate-acetate; the reaction is usually complete after 20 minutes. The very small degradation of the cellulose derivative, the clear solutions, free from fibers, and the high mechanical strength of the threads and films prepared therefrom are remarkable.

It is surprising that the hydrochloric acid which is formed in a high concentration and in a large excess in comparison with the cellulose ester does not hydrolyze the cellulose ester to a great extent and degrade it say to glucose or the derivatives thereof; particularly in view of the fact that the glacial acetic acid is entirely consumed for the dissolution of the cellulose nitrate in view of the concentrations of the cellulose nitrate solutions which enter into consideration (above 10 per cent dry content), i. e. that the above reaction occurs within the cellulose micellae while in the form of a solvate.

Now, the degradation, to be expected, does not occur because the hydrogen chloride, owing to its feeble solubility in glacial acetic acid, violently escapes immediately after its formation, a process, which is still accelerated by increasing the reaction temperature to 50° C.–60° C. The hydrogen chloride in statu nascendi obviously splits off spontaneously the $NO_2$-group without any secondary reactions. The peculiarity of this reaction and its novelty for the formation of the cellulose acetate reside in the fact that in a single reaction within the dissolved cellulose ester and positively at one and the same place there are formed the agent splitting off the $NO_2$-groups (HCl) and the agent introducing the acetyl groups ($CH_3COCl$), the first being eliminated immediately after its formation owing to its lack of solubility.

This working method also involves the special advantage that the reaction mixture, after the correctly conducted reaction is complete, consists only of cellulose nitrate-acetate and glacial acetic acid. Thionyl chloride completely decomposes under the conditions indicated into volatile constituents, so that only traces of sulfur dioxide and hydrogen chloride are present, substances which, as is known, can easily be eliminated from cellulose esters. After the nitrate-acetate has been washed free from acid, it is completely stable.

The thionyl chloride offers special advantages, but the process according to this invention is not limited to the use of this acid chloride. Similar effects are also obtainable with sulfuryl chloride, phosphorus oxychloride, phosphorus trichloride, phosphorus pentachloride, also with phosgene and other substances of similar action, which react with acetic acid and other carboxylic acids while forming their chlorides.

A special mode of execution of this process is the re-esterification while completely preserving the fiber. It is the same reaction which is performed, the cellulose nitrate is, however, not dissolved, but suspended in a hydrocarbon. Benzene and the homologues thereof are particularly appropriate, because they penetrate the cellulose micella and, together with the glacial acetic acid or the acetic anhydride added, cause the fibers to swell, whereby the agents can more easily penetrate. Analysis shows that the cellulose nitrate fiber in such mixtures becomes enriched with acetic acid, it is impregnated therewith, and, on addition of acid chlorides, the reaction above indicated occurs in the micella. It is evident that this reaction, owing to the dilution, occurs more slowly than in the use of the solution. Generally, it is complete in about 6–8 hours at 50° C.–60° C. The mononitrate-acetates obtained, practically, have the same properties as those obtained according to the process first described. The preservation of the fiber has, however, an important economical advantage. The hydrocarbon containing acetic acid, can be separated from the fiber mass to a great extent and may be recovered in a pure form by distillation over anhydrous sodium acetate and fractionation. The consumption of acetic acid in this process is considerably smaller than in any of the known acetylating processes and the greatest part of the acetic acid which has not participated in the reaction is recovered in a highly concentrated form.

The following examples illustrate the invention.

*Example 1.*—100 parts of collodion cotton containing 11.1% of nitrogen and 5% of water (determined by drying the collodion cotton in a desiccator containing $P_2O_5$) are dissolved in 400 parts of glacial acetic acid. 200 parts of thionyl chloride are added to this solution and the whole is mixed until a completely homogeneous solution has been formed. After a few minutes the evolution of hydrogen chloride and sulfur dioxide begins, the reaction mixture being spontaneously heated. When the evolution of gas has decreased, the reaction is completed by heating to 50° C.–60° C., whereby currents of hydrogen chloride and sulfur dioxide mixed with nitrous gases escape. The reaction is complete when the evolution of gas is finished. The clear viscous reaction mixture is poured into water, whereupon the mononitrate-acetate separates in the form of white flakes which are washed until they are free from acid. It contains 5.2% of nitrogen and 41% of acetic acid.

*Example 2.*—250 grams of commercial acetic anhydride, consisting of 85% of acetic anhydride and 15% of acetic acid, are dissolved in 1 liter of benzene. 15 grams of thionyl chloride and 5 grams of sulfuryl chloride are added and 150 grams of collodion cotton having a moisture content of 5%, are introduced into the solution. The reaction mixture becomes spontaneously heated within 5 minutes to about 60° C., red vapors being simultaneously formed, which are preferably eliminated from the mixture by a slow current of nitrogen. After 3 hours a mixture of 50 grams of acetic anhydride and 50 grams of benzene are added and the temperature is elevated to 55° C.–60° C. by gently heating. After 6 hours the liquid consisting principally of benzene and acetic acid with small quantities of nitric acid, sulfuric acid and hydrochloric acid, is poured off and separated from the fibers as completely as possible. By distilling the liquid over anhydrous sodium acetate, a nearly anhydrous mixture of benzene and glacial acetic acid is obtained. The cotton is freed from benzene and glacial acetic acid by distilling with steam. The residue of acid is eliminated from the cotton by washing it with water. After the water has been eliminated in known manner, for instance, by a treatment with alcohol, the nitrate-acetate is in a state ready for use and can be made into artificial articles of the most varied kinds.

*Example 3.*—20 parts of nitrocellulose containing 11.7% of nitrogen are caused to swell by a treatment with concentrated formic acid (sp. gr.=1.22) at ordinary temperature for about 1 hour. After pressing the mixture to about double its weight the nitrocellulose wet with formic acid is mixed, while cooling, with 200 parts of a mixture containing 50 parts of commercial acetic anhydride and 150 parts of benzene. While further cooling, 5 parts of thionyl chloride and 1 part of sulfuryl chloride are added and then the mixture is warmed to about 30° C. The esterification begins with evolution of nitric oxide and gaseous hydrochloric acid. Then a further quantity of 100 parts of collodion cotton of the same composition and containing preferably 5 per cent of moisture are added and the reaction is completed by heating to about 60° C. In the procedure just described, formic acid is used only in order to initiate the reaction. A cellulose nitrate-diacetate is obtained containing 4.4% of nitrogen.

Our invention is not limited to the foregoing examples or to the specific details given therein.

In a completely analogous manner nitrocellulose may be transformed into mixed esters by a corresponding treatment with chloro-acetic acid, acetyl glycolic acid, propionic acid, butyric acid and other substituted or unsubstituted fatty acids.

In the claims following hereafter the term "fatty acids" is intended to include the substituted and unsubstituted fatty acids.

What we claim is:—

1. The process which comprises treating nitrocellulose in a reaction mixture containing in statu nascendi hydrogen chloride and a fatty acid chloride.

2. The process which comprises dissolving nitrocellulose in a concentrated fatty acid and treating it in a reaction mixture containing in statu nascendi hydrogen chloride and a fatty acid chloride.

3. The process which comprises treating fibrous nitrocellulose swollen by a swelling agent in a reaction mixture containing in statu nascendi hydrogen chloride and a fatty acid chloride.

4. The process which comprises dissolving moist nitrocellulose in a fatty acid, adding to the solution a compound which transforms the fatty acid into the corresponding fatty acid chloride while forming hydrogen chloride in statu nascendi and carrying the reaction to an end by heating the reaction mixture to 50 to 60° C.

5. The process which comprises dissolving moist nitrocellulose in glacial acetic acid, adding to the solution thionyl chloride and carrying the reaction to an end by heating the reaction mixture to 50 to 60° C.

6. The process which comprises acting upon moist fibrous nitrocellulose with a reaction mixture containing an aromatic hydrocarbon, a fatty acid anhydride and an acid chloride of the group consisting of thionyl chloride, sulfuryl chloride, phosphorus oxychloride, phosphorus trichloride, phosphorus pentachloride and carbonyl chloride.

7. The process which comprises treating 150 parts of moist collodion cotton with a mixture containing 250 parts of commercial acetic anhydride, 1000 parts of benzene, 15 parts of thionyl chloride and 5 parts of sulfuryl chloride and carrying the reaction to an end by a further addition of 50 parts of acetic anhydride and 50 parts of benzene and by heating the mixture to 55–60° C.

8. The process which comprises treating nitrocellulose with a fatty acid in the presence of a small quantity of water and a compound capable of forming the chloride of said fatty acid while developing hydrochloric acid.

9. The process which comprises dissolving moist nitrocellulose in a concentrated fatty acid and treating the solution with a compound capable of forming the chloride of said fatty acid while developing hydrochloric acid.

10. The process which comprises treating fibrous nitrocellulose swollen by a swelling agent with a fatty acid in the presence of a small quantity of water and a compound capable of forming the chloride of said fatty acid while developing hydrochloric acid.

11. The process which comprises dissolving moist nitrocellulose having a nitrogen content of about 10.5 to 12.5 per cent in a concentrated fatty acid and treating the solution with a compound capable of forming the chloride of said fatty acid while developing hydrochloric acid.

12. The process which comprises treating fibrous nitrocellulose having a nitrogen content of about 10.5 to 12.5 per cent, swollen by a swelling agent with a fatty acid in the presence of a small quantity of water and a compound capable of forming the chloride of said fatty acid while developing hydrochloric acid.

13. The process which comprises dissolving 100 parts of collodion cotton having a nitrogen content of 11.1 per cent and containing 5 per cent of water in 400 parts of glacial acetic acid, adding 200 parts of thionyl chloride while uniformly mixing the whole, and carrying the reaction to an end by heating the reaction mixture to about 50 to 60° C.

14. The process which comprises causing 20 parts of nitrocellulose containing about 11.7 per cent of nitrogen to swell by acting on said nitrocellulose with concentrated formic acid at ordinary temperature for about one hour, pressing the mass which is obtained to about double its weight, adding 200 parts of a mixture containing 50 parts of commercial acetic anhydride, 150 parts of benzene, 5 parts of thionyl chloride, and 1 part of sulfuryl chloride while cooling, heating the mixture to about 30° C., then adding a further quantity of 100 parts of collodion cotton containing 5 per cent of moisture and completing the reaction by heating the mixture to about 60° C.

ADOLF WEIHE.
KURT THINIUS.